United States Patent
Balasu

(10) Patent No.: US 7,082,809 B2
(45) Date of Patent: Aug. 1, 2006

(54) HIGH CAPACITY MECHANICAL DRIVE ARRANGEMENT

(75) Inventor: Mircea G. Balasu, Sterling Heights, MI (US)

(73) Assignee: Beaver Aerospace & Defense, Inc., Livonia, MI (US)

( * ) Notice: Subject to any disclaimer, the term of this patent is extended or adjusted under 35 U.S.C. 154(b) by 319 days.

(21) Appl. No.: 10/462,205

(22) Filed: Jun. 12, 2003

(65) Prior Publication Data

US 2004/0020379 A1 Feb. 5, 2004

Related U.S. Application Data

(60) Provisional application No. 60/400,146, filed on Aug. 1, 2002.

(51) Int. Cl.
*B30B 1/18* (2006.01)
*B21J 9/18* (2006.01)

(52) U.S. Cl. .................. 72/454; 100/269.8; 100/289

(58) Field of Classification Search .............. 72/454; 100/269.8, 289
See application file for complete search history.

(56) References Cited

U.S. PATENT DOCUMENTS

| | | | |
|---|---|---|---|
| 50,494 A | 10/1865 | Rayner | 100/127 |
| 216,392 A | 6/1879 | Gardner | 100/230 |
| 240,912 A | 5/1881 | Leavitt | 100/230 |
| 954,449 A | 4/1910 | Mead | 100/230 |
| 3,741,108 A | 6/1973 | Stratman | 100/229 |
| 3,830,615 A * | 8/1974 | Walchhuetter | 72/454 |
| 3,908,712 A | 9/1975 | Paletzki | 140/1 |
| 3,921,515 A | 11/1975 | Eckerle et al. | 100/229 |
| 4,413,555 A | 11/1983 | Swinney | 100/214 |
| 4,563,889 A * | 1/1986 | Landwehr | 72/454 |
| 4,782,749 A * | 11/1988 | Iwasaki et al. | 72/454 |
| 4,823,687 A | 4/1989 | Yonezawa et al. | 100/346 |
| 4,827,839 A | 5/1989 | Yonezawa et al. | 100/346 |
| 4,873,923 A | 10/1989 | Manning | 100/285 R |
| 4,920,783 A * | 5/1990 | Greaves et al. | 72/454 |
| 5,467,707 A | 11/1995 | Kanamaru | 100/292 |
| 5,669,296 A | 9/1997 | Newton | 100/99 |
| 6,182,492 B1 * | 2/2001 | Raffin et al. | 72/454 |
| 6,301,768 B1 | 10/2001 | Toeniskoetter | 29/509 |
| 6,520,077 B1 * | 2/2003 | Minagawa et al. | 100/289 |
| 6,615,712 B1 * | 9/2003 | Faitel et al. | 100/289 |
| 2002/0069770 A1 | 6/2002 | Faitel et al. | 100/289 |

FOREIGN PATENT DOCUMENTS

| | | |
|---|---|---|
| DE | 2356517 | 5/1975 |
| JP | 05329690 | 5/1992 |
| JP | 10272598 | 10/1998 |

* cited by examiner

*Primary Examiner*—David B. Jones
(74) *Attorney, Agent, or Firm*—Rohm & Monsanto, PLC

(57) ABSTRACT

A drive arrangement for a hemming press uses a ballscrew drive arrangement with a longitudinal axis. A first gimbal connected to the externally threaded screw shaft connects the externally threaded screw shaft to a stationary member. The platen is movable with respect to the stationary member. A second gimbal connected to the internally threaded nut connects the internally threaded nut to the platen. The gimbals accommodate transaxial displacement of the screw drive arrangement. A motor applies torque to the ballscrew drive arrangement. Transaxial loading of the screw drive arrangement is accommodated by the first and/or second gimbals. Severe forces resulting from crashes are accommodated by force limiting arrangements and resilient devices.

47 Claims, 15 Drawing Sheets

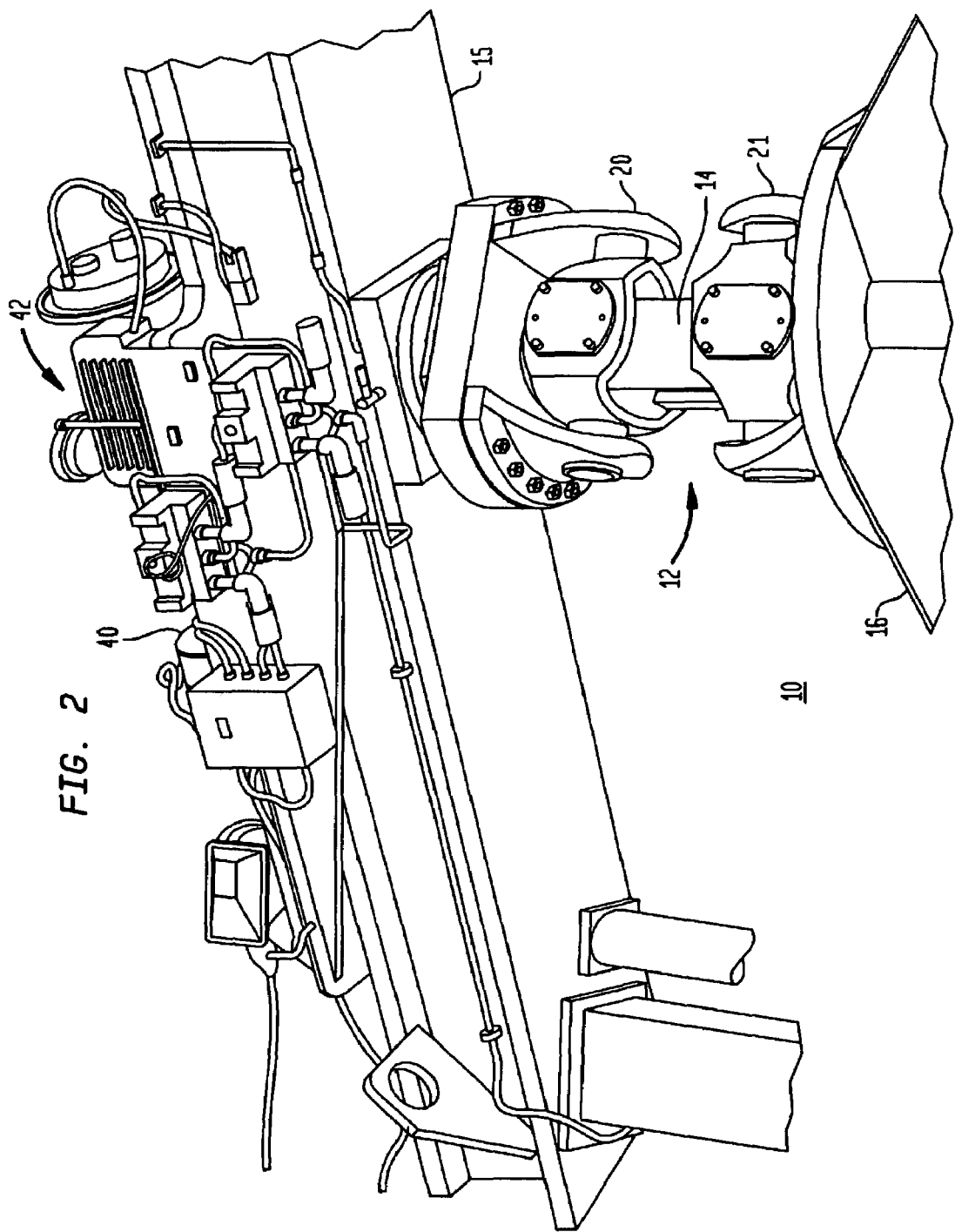

HIGH CAPACITY MECHANICAL DRIVE ARRANGEMENT

RELATIONSHIP TO OTHER APPLICATION

This application claims the benefit of Provisional Patent Application Ser. No. 60/400,146, filed Aug. 1, 2002.

BACKGROUND OF THE INVENTION

1. Field of the Invention

This invention relates generally to mechanical drive arrangements, and more particularly, to a high capacity press system that is driven in response to actuation of a ballscrew drive that is coupled to a platen of the press via gimbals, universal joints, end rods, or any other system that is suitable for accommodating canting of the platen or other transaxial motion.

2. Description of the Related Art

Conventional high capacity press systems, such as those that are employed in the motor vehicle manufacturing industry to stamp and hem sheet metal body panels and doors, employ stationary and translatable stamping portions, the translatable stamping portion generally being guided along a predetermined path of travel. In some known arrangements, a generally rectangular translatable stamping portion is provided with a guidance arrangement having four guide posts on which are slidably engaged respective guide bushings that are coupled to the translatable stamping portion. The displacement of the translatable stamping portion is responsive to a hydraulic or electromechanical drive arrangement that urges the translatable stamping portion toward the stationary stamping portion with great force. In press systems that are employed in the manufacture and hemming of vehicle body panels, forces on the order of several hundred tons are applied to the product interposed between the translatable stamping portion and the stationary stamping portion.

It is a problem with conventional high capacity electromechanical press systems that catastrophic failure of the platen drive arrangement, particularly when the platen drive has incorporated therein a ballscrew system, will result from high offset forces and bending moments. Such compression forces are particularly severe when safety systems of the press, such as limit switches, fail or when hand tools or other foreign objects are inadvertently left on the stationary die bed, and generally will result in crash load forces of magnitudes that damage the platen drive arrangement.

It is another problem with conventional high capacity electro-mechanical press systems that excessive wear causes a reduction in the operating interval between overhauls to well under one million operating cycles. On the other hand, conventional hydraulic high capacity press systems require extended cycling times and frequent maintenance schedules due to leakage.

It is, therefore, an object of this invention to provide a high capacity press system that is less likely to suffer catastrophic failure resulting from excessive offset forces and bending moments to the platen when a foreign object, such as a hand tool, is compressed after inadvertently being left between press dies.

It is also an object of this invention to provide a high capacity press system that has a greater interval between major overhauls.

It is another object of this invention to provide a high capacity press system that has a reduced cycling time, thereby achieving greater throughput.

It is a still further object of this invention to provide a high capacity press system that controls or limits the crash force applied to the platen drive arrangement.

SUMMARY OF THE INVENTION

The foregoing and other objects are achieved by this invention which provides, in accordance with a first apparatus aspect thereof, a drive arrangement for exerting a bidirectional substantially axial force between first and second structures. A screw drive arrangement has an internally threaded nut and an externally threaded screw shaft, the externally threaded screw shaft is characterized with a longitudinal axis. The externally threaded screw shaft is threadedly engaged with the internally threaded nut. A first coupling connects the externally threaded screw shaft to one of the first and second structures. Similarly, a second coupling that is connected to the internally threaded nut and the other of the first and second structures. One of the first and second couplings is configured to accommodate transaxial displacement of the screw drive arrangement. A rotatory drive arrangement applies a torque to the screw drive arrangement for effecting rotatory displacement between the internally threaded nut and the externally threaded screw shaft. The magnitude of the bidirectional substantially axial force is responsive to the magnitude of the torque applied by the rotatory drive arrangement, and the direction of the bidirectional substantially axial force is responsive to the direction of the torque applied by the rotatory drive arrangement. Transaxial loading of the screw drive arrangement is accommodated by the transaxial displacement of the selected one of the first and second couplings.

In one embodiment, the first coupling is arranged to connect the externally threaded screw shaft to the rotatory drive arrangement, and in another embodiment, the second coupling is arranged to connect the internally threaded nut to the rotatory drive arrangement.

In a highly advantageous embodiment of the invention, the screw drive arrangement is a ballscrew arrangement, and there is further provided a plurality of recirculating load bearing balls arranged in sequence and interposed between the internally threaded nut and the externally threaded screw shaft. The plurality of recirculating load bearing balls are arranged in plural recirculating load bearing ball circuits. In a specific illustrative embodiment of the invention, there is further provided a plurality of recirculating spacer balls in the sequence of recirculating load bearing balls for reducing scuffing friction between the recirculating load bearing balls, which are each dimensioned smaller than each of the plurality of recirculating load bearing balls.

The selected one of the first and second couplings is configured to accommodate two degrees of transaxial freedom of displacement with respect to the longitudinal axis. In one advantageous embodiment, the selected one of the first and second couplings constitutes a gimbal. However, in another embodiment of the invention, the selected one of the first and second couplings constitutes a spherical roller thrust bearing arrangement. The spherical roller thrust bearing arrangement is provided with upper and lower bearing arrangements, and there is further provided a rotatory power coupling affixed to a selected one of the internally threaded nut and the externally threaded screw shaft for receiving rotatory energy from the rotatory drive arrangement. The rotatory power coupling is axially interposed between the upper and lower bearing arrangement and is provided with a toothed element for engaging a correspondingly configured flexible drive member, such as a belt or a chain, that engages the rotatory drive arrangement and transmits the rotatory energy to the toothed element.

In a practical embodiment of the invention, each of the first and second couplings is configured to accommodate transaxial displacement with respect to the longitudinal axis of the screw drive arrangement. Each of the first and second couplings constitutes a gimbal, and there is accordingly afforded a greater tolerance of side loading that otherwise might damage the screw drive arrangement.

In an advantageous application of this aspect of the invention, the first and second structures are a stationary member and a translatable platen of a press, respectively. The first coupling is arranged to connect the externally threaded screw shaft to a one of the stationary member and the translatable platen of the press, and the second coupling is arranged to couple the internally threaded nut to the other of the stationary member and the translatable platen of the press.

In accordance with a second apparatus aspect of the invention, there is provided a drive arrangement for exerting a bidirectional substantially axial force between first and second structures that are vertically movable with respect to each other. The drive arrangement is provided with a screw drive arrangement that includes an internally threaded nut and an externally threaded screw shaft. The externally threaded screw shaft has a vertically arranged longitudinal axis and is threadedly engaged with the internally threaded nut. A first coupling is connected to the externally threaded screw shaft and is configured to connect the externally threaded screw shaft and the first structure. The first structure is fixed in a superior location to the second structure. A second coupling is connected to the internally threaded nut and is configured to connect the internally threaded nut and the second structure at a predetermined location of the second structure. The second structure has an imbalance about the predetermined location. A selected one of the first and second couplings is configured to accommodate transaxial displacement of the screw drive arrangement. A rotatory drive arrangement is provided for applying a torque to the screw drive arrangement for effecting rotatory displacement between the internally threaded nut and the externally threaded screw shaft. The magnitude of the bidirectional substantially axial force is responsive to the magnitude of the torque applied b y the rotatory drive arrangement, and the direction of the bidirectional substantially axial force is responsive to the direction of the torque applied by the rotatory drive arrangement. The transaxial loading of the screw drive arrangement resulting from the imbalance of the second structure is accommodated by the selected one of the first and second couplings configured to accommodate transaxial displacement of the screw drive arrangement.

In one embodiment of this second aspect of the invention there is further provided a working die installed on the second structure, the working die is asymmetrically arranged about the predetermined location of the second structure where the second coupling is connected so as to cause at least part of the imbalance. In this specific illustrative embodiment of the invention, the second coupling is the selected one of the first and second couplings and is configured to accommodate transaxial displacement of the screw drive arrangement.

In the specific embodiment, the selected one of the first and second couplings is configured to accommodate a transaxial displacement of the screw drive arrangement of up to 10 degrees. It is desired that the accommodation of transaxial displacement causes transaxial loading of the screw drive arrangement to be limited to less than approximately ten percent (10%) of the axial load. In a practical embodiment, the accommodated transaxial displacement is less than 3 degrees.

In other embodiments of the invention, the first coupling is configured to accommodate transaxial displacement of the screw drive arrangement.

In a further embodiment of the invention, there is provided a guide arrangement for guiding the second structure along a predetermined path in response to the torque applied by the rotatory drive arrangement. The guide arrangement is provided with a vertical guide post and a guide bushing engaged with the vertical post. In such an embodiment, the guide bushing is coupled to the second structure.

In a particularly advantageous application of the invention, the second structure constitutes a movable platen of a press, particularly a hemming press for stamping and hemming sheet metal components for vehicles. In such an application, to which the present invention is particularly suited, the movable platen experiences an operating load of approximately between 25,000 lbf. and 50,000 lbf. in tension and approximately 220,000 lbf. in compression, applied over a service life of approximately 8.6 million cycles. In order to achieve such operating criteria, the screw drive arrangement, in a particularly advantageous embodiment of the invention, is a ballscrew arrangement. There is further provided a plurality of load bearing balls interposed between the internally threaded nut and the externally threaded screw shaft. In the specific illustrative embodiment of the invention, the load bearing balls are interposed between the internally threaded nut and the externally threaded screw shaft, and are dimensioned within a tolerance of approximately 25 millionths of an inch. Approximately 360 load bearing balls are, in this specific illustrative embodiment of the invention, arranged in three ball circuits, each circuit having approximately 5 active turns. The externally threaded screw shaft is hardened to approximately between 56 to 60 on the Rockwell hardness scale, and is dimensioned to an outside diameter of approximately 6 in., and a pitch lead of approximately 0.9845 in. Preferably, the screw drive arrangement is a free fall ballscrew arrangement with zero pre-load.

In a still further embodiment of the invention, there is provided an energy absorbing element for absorbing energy resulting from a crash load of the movable platen. The energy absorbing element is provided with a resilient element having a predetermined resilience characteristic responsive to the application of an axial load. In a specific illustrative embodiment of the invention, the resilient element is provided with a wedge-shaped resilient element that converts axial deformation responsive to the application of the axial load into radial resilient deformation.

In a still further aspect of the invention, there is provided a drive arrangement for a platen of an automotive body panel stamping press. There is provided a ballscrew apparatus that includes an internally threaded nut and an externally threaded screw shaft that threadedly engages the internally threaded nut. A plurality of recirculating load bearing balls arranged such that the balls are in sequence and interposed between the internally threaded nut and the externally threaded screw shaft. Preferably, the load bearing balls are arranged in a plurality of recirculating load bearing ball circuits. A first coupling is connected to the externally threaded screw shaft for connecting the externally threaded screw shaft to a stationary member of the press, and a second coupling connects to the internally threaded nut for connecting the internally threaded nut to the platen of the press.

There is additionally provided in accordance with this further aspect of the invention a rotatory drive arrangement connected to the externally threaded screw shaft and configured to rotate the externally threaded screw shaft relative to the internally threaded nut. In this manner, there is imparted a substantially axial reciprocal motion between the movable platen and the stationary member of the press. At least one of the first and second couplings is arranged to accommodate transaxial loading of the ballscrew apparatus during the substantially axial reciprocal motion between the movable platen and the stationary member of the press.

The substantially axial reciprocal motion between the movable platen and the stationary member of the press is oriented vertically, and the ballscrew apparatus is a free fall ballscrew arrangement with zero pre-load. The first coupling, in this embodiment, constitutes a gimbal that is arranged to provided two degrees of transaxial freedom to the externally threaded screw shaft relative to the substantially axial reciprocal motion between the movable platen and the stationary member of the press. The accommodation of transaxial displacement limits transaxial loading of the screw drive arrangement to less than approximately ten percent (10%) of the axial load. Preferably, the required accommodated transaxial displacement is less than 3 degrees.

In this specific illustrative embodiment of the invention, the screw shaft is dimensionally characterized by an outside diameter of approximately 6 in., and a pitch lead of approximately 0.9845 in.

The second coupling constitutes a gimbal that is arranged to provided two degrees of transaxial freedom to the internally threaded nut relative to the substantially axial reciprocal motion between the movable platen and the stationary member of the press.

In another embodiment, the first coupling is provided with a spherical roller thrust bearing arrangement that is arranged to provided two degrees of transaxial freedom to the externally threaded screw shaft relative to the substantially axial reciprocal motion between the movable platen and the stationary member of the press. The spherical roller thrust bearing arrangement is provided with upper and lower bearing arrangements, and there is further provided a rotatory power coupling affixed to the externally threaded screw shaft for receiving rotatory energy from the rotatory drive arrangement. The rotatory power coupling is axially interposed between the upper and lower bearing arrangement.

In another embodiment of the invention, the first coupling is provided with a partially spherical end portion of the externally threaded screw shaft. The partially spherical end portion of the externally threaded screw shaft is internally partially spherical.

In a further embodiment of the invention, there is provided a plurality of recirculating spacer balls in the sequences of recirculating load bearing balls in the plural recirculating load bearing ball circuits for reducing scuffing friction between the recirculating load bearing balls.

In still another embodiment, the plurality of load bearing balls constitutes approximately 360 load bearing balls arranged in three ball circuits, each circuit having approximately 5 active turns.

In order to achieve the severe operating criteria in the context of a drive for a platen of a stamping press for sheet metal vehicle body components, the plurality of recirculating load bearing balls interposed between the internally threaded nut and the externally threaded screw shaft are dimensioned within a tolerance of approximately 25 millionths of an inch. The externally threaded screw shaft is hardened to approximately between 56 to 60 on the Rockwell hardness scale.

In accordance with a mechanical press drive aspect of the invention for advancing and retracting a movable platen of a press, there is provided a ballscrew apparatus including a nut and a screw threadedly engaging the nut. A first coupling is connected to the screw and is configured to connect the screw and one of a movable platen of a press or a stationary member of the press. A second coupling is connected to the nut and is configured to connect the nut and the other of the platen and the stationary member of the press. A drive motor is operably connected to one of the nut and screw and configured to relatively rotate the nut and screw to impart reciprocal motion to the movable platen. The two couplings are configured to cooperatively isolate the ballscrew apparatus from offset and moment loading that may occur during press operation.

In one embodiment of this mechanical press drive aspect of the invention, the first coupling is configured to couple the screw to an output of the motor. The second coupling is configured to couple the nut to the movable upper platen of the press, and the drive motor is configured to be supported on a stationary member of the press and to rotate the screw to impart reciprocal motion of the movable platen of a the press.

In a further embodiment, the ballscrew apparatus is configured to suspend a vertically movable upper platen from a stationary crown. At least one of the couplings constitutes a gimbal having an inner trunnion pivotally coupled to the nut an outer trunnion pivotally coupled to the inner trunnion, and a lower mount coupled to the outer trunnion and configured to connect to an upper platen of the press. In accordance with a specific illustrative embodiment of this aspect of the invention, the first coupling constitutes a drive shaft coupled to the output of the motor and an upper gimbal. An inner trunnion is pivotally coupled to the nut, an outer trunnion is pivotally coupled to the inner trunnion, and an upper mount coupling the outer trunnion to the drive shaft. Further in this embodiment, the first coupling constitutes a thrust shaft that is connected at an upper end to a lower end of the drive shaft, and is connected at a lower end to the upper mount. A thrust bearing configured to rotatably support the thrust shaft on the crown of a press while isolating the gearbox from compressive forces generated by the ballscrew apparatus.

The motor output is coupled to a gearbox, an output of the gearbox is coupled to a drive shaft; and the drive shaft is coupled to the screw.

BRIEF DESCRIPTION OF THE DRAWING

Comprehension of the invention is facilitated by reading the following detailed description, in conjunction with the annexed drawing, in which:

FIG. 2 is an enlarged perspective representation of the ballscrew portion of the press system of FIG. 1;

DETAILED DESCRIPTION

Figure 1:
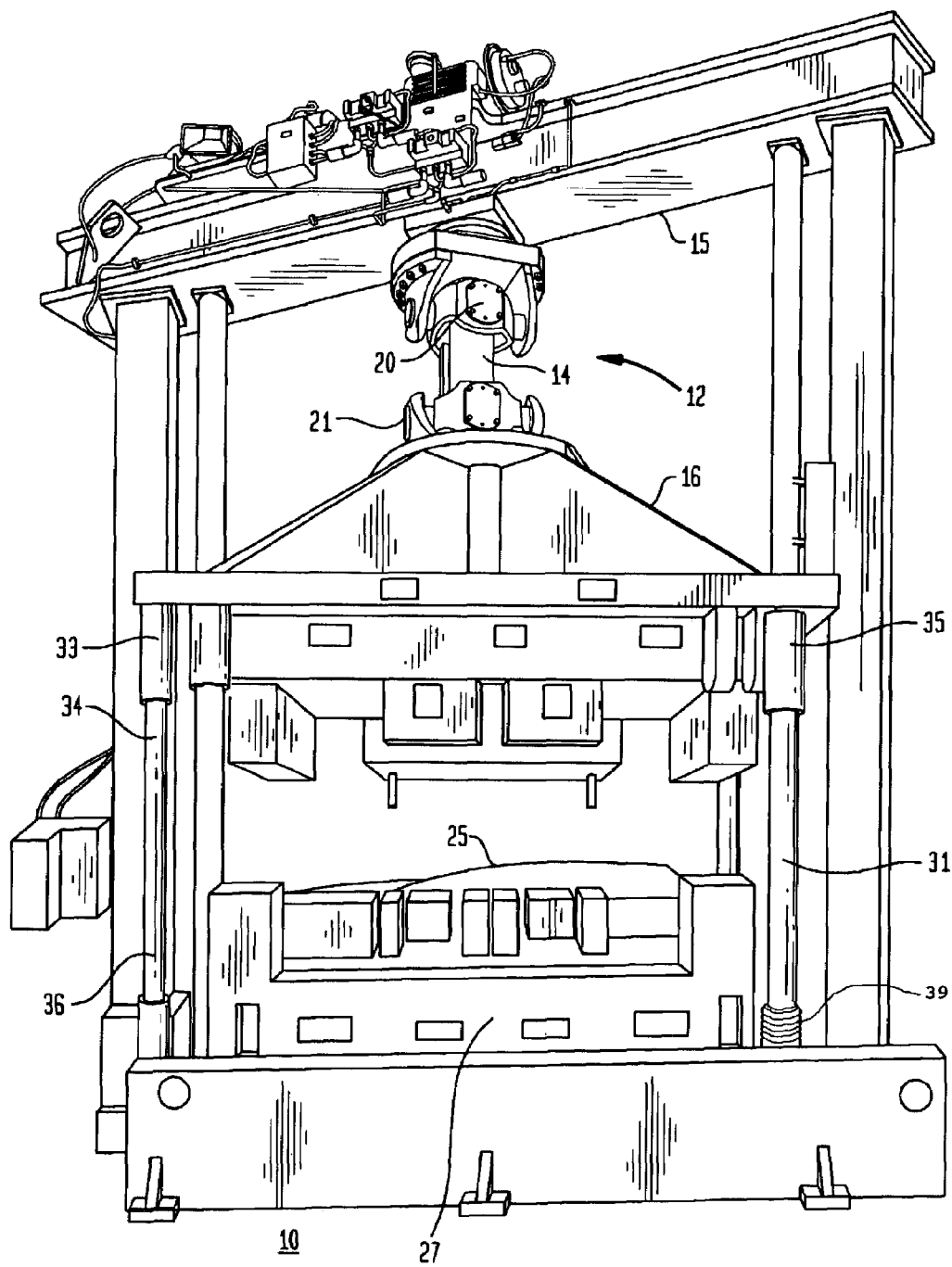
FIG. 1 is a perspective representation of a press system that is actuated by a ballscrew arrangement in accordance with the principles of the invention.

FIG. 1 is a perspective representation of a press system 10 that is actuated by a ballscrew arrangement 12 in accordance with the principles of the invention. As shown in this figure, ballscrew arrangement 12 consists of a ballscrew arrangement 14 that is coupled between an overhead support structure 15 and a translatable platen 16. In this specific illustrative embodiment of the invention, ballscrew arrangement 14 is coupled to the overhead support structure and the translatable platen by respective gimbals 20 and 21, it being noted that two such gimbals are not required in the practice of the invention. The ballscrew arrangement and the gimbals will be described in greater detail below.

In this specific illustrative embodiment of the invention, press system 10 is of the type that is used in the automobile manufacturing industry for the purpose of stamping sheet metal body panels and for hemming same, as is customarily done during the manufacture of automotive vehicle doors. In FIG. 1, for example, a sheet metal panel 25 is disposed on a stationary platen 27 arranged in this embodiment directly below translatable platen 16. The translatable platen is actuated toward, and retracted from, stationary platen 27 by operation of ballscrew arrangement 14.

Translatable platen 16 is guided in this specific illustrative embodiment of the invention along a predetermined path to and from (downward and upward) translatable platen 16 and sheet metal panel 25 by guide posts 30 and 31 that are in communication with translatable platen 16 via respectively associated ones of guide bushings 33 and 35. In this specific illustrative embodiment of the invention, guide posts 30 and 31 are coupled at their respective upper ends to overhead support structure 15, and therefore are disposed on diagonally opposite corners of translatable platen 16, as shown. There are additionally provided, to stabilize the remaining corners of translatable platen 16, a pair of shorter guide posts 36 and 37.

Operation of the press system may, on occasion, result in malfunction of a safety system (not shown), such as software or a limiter switch. The result could be catastrophic to the system as the platen is brought into unlimited communication with stationary platen 27. Such a crash condition is, in this specific illustrative embodiment of the invention, ameliorated by a resilient element 39 that absorbs some of the crash energy, as will be described hereinbelow.

FIG. 2 is an enlarged perspective representation of ballscrew arrangement 14 of press system 10 of FIG. 1. In this figure, it is seen that ballscrew arrangement 14 is actuated in response to a motor 40, that is only partially visible in this figure, and provides rotatory energy to a transmission system 42. In this specific illustrative embodiment of the invention, motor 40 is an electric motor.

Figure 3A:
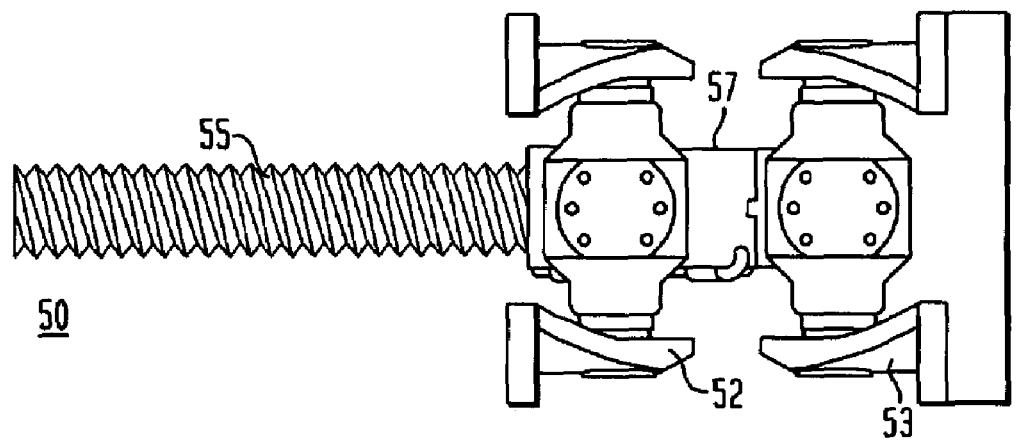
FIGS. 3A and 3B are simplified schematic orthogonal side representations of a ballscrew arrangement having a gimbal attached thereto.
Figure 3B:
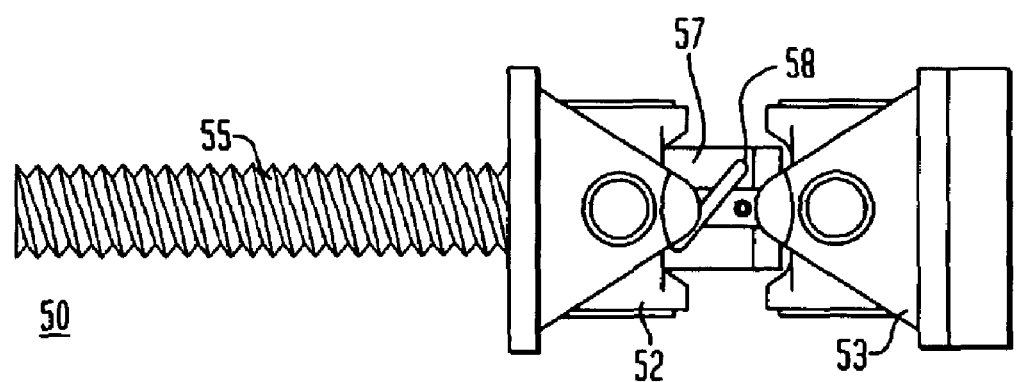
Figure 4:
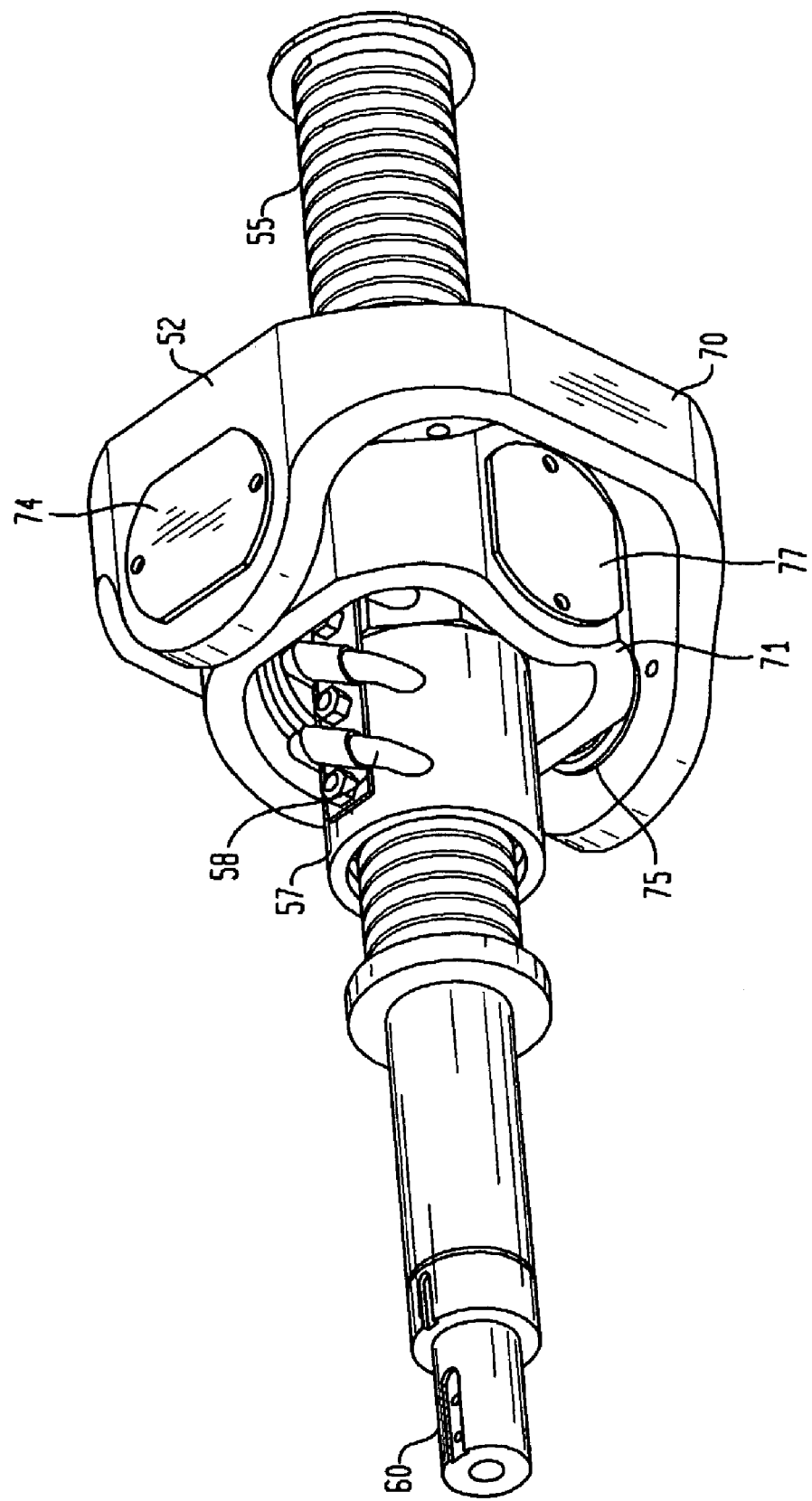
FIG. 4 is a simplified schematic perspective representation of a gimbal coupled to a ball nut for use in the present invention.

FIGS. 3A and 3B are simplified schematic orthogonal side representations of a ballscrew arrangement 50 having a first gimbal 52 and a second gimbal 53 attached thereto. Ballscrew arrangement 50 is provided with a threaded shaft 55 with which is threadedly engaged a ball nut 57. Ball nut 57 is shown in FIG. 3B to have a ball return circuit 58. In this specific illustrative embodiment of the invention, first gimbal 52 is fixed to rotate with ball nut 57, and second gimbal 53 is fixed to rotate with threaded shaft 55. With respect to the specific illustrative embodiment of the invention shown in FIGS. 1 and 2, gimbal 20 is fixed to the threaded shaft (not specifically designated in FIGS. 1 and 2) of ballscrew arrangement 14, and therefore bears analogous correspondence to second gimbal 53 of FIGS. 3A and 3B, and gimbal 21 is fixed to the ball nut (not specifically designated in FIGS. 1 and 2), and therefore bears analogous correspondence to first gimbal 52 of FIGS. 3A and 3B FIG. 4 is a simplified schematic perspective representation of first gimbal 52 coupled to ball nut 57 for use in press system 10 (not shown in this figure). As previously noted, ball nut 57 is threadedly coupled with threaded shaft 55, and contains therewithin a plurality of load bearing balls (not shown) that recirculate via ball return circuit 58. This figure additionally shows a coupling portion 60 that is coaxial with threaded shaft 55. Coupling portion 60 engages with gimbal 20 (FIGS. 1 and 2).

In this specific illustrative embodiment of the invention, first gimbal 52 is of the type that permits two orthogonal degrees of transaxial motion. More specifically, an exterior gimbal mount 70 is pivotally coupled to an interior gimbal mount 71 at pivot couplings 74 and 75. Interior gimbal mount 71, however, is similarly pivotally coupled to ball nut 57 at pivot coupling 77, and at a diametrically opposed pivot coupling that is not shown in this figure. The orthogonal degrees of transaxial freedom accommodate canting that could be experienced by translatable platen 16 as it is urged toward stationary platen 27, resulting in a significant reduction in wear of the various components of ballscrew arrangement 12. In a practical embodiment of the invention, the pivoting motion of the gimbals can be as high as 10 degrees.

Figure 5:
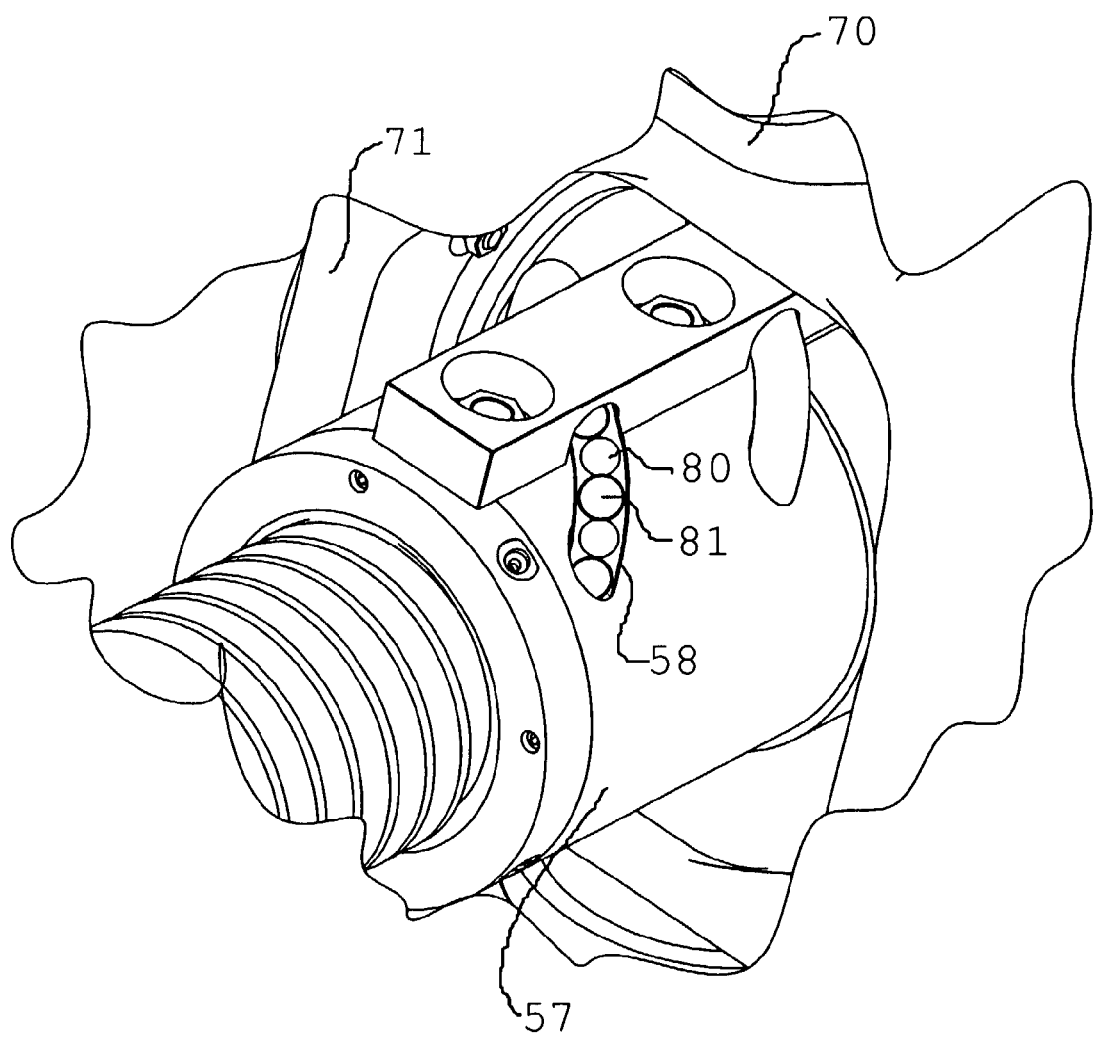
FIG. 5 is a simplified partially fragmented schematic perspective representation showing load bearing balls and a spacer ball.

FIG. 5 is a simplified partially fragmented schematic perspective representation showing a load bearing ball 80 and a spacer ball 81 in ball return circuit 58 (see, FIG. 4). As shown, load bearing ball 80 is shown in the partially fragmented representation of ball return circuit 58. In this specific illustrative embodiment of the invention there is provided a spacer ball 81 that is dimensioned slightly smaller than load bearing balls 80. In this embodiment, spacer ball 81 is but one of a plurality of spacer balls that serve to improver the efficiency of the ball screw apparatus, but do not carry any of the loading borne by the load bearing balls. The spacer balls reduce the scuffing friction between the load bearing balls. In operation, the spacer balls are included in the train of load bearing balls at predetermined points therealong, which could be one spacer ball for every n load bearing balls, where n≧1. The use of spacer balls reduces the load carrying capacity of the ballscrew apparatus, but compensation therefor can be achieved by increasing the length of the ball nut body and adding thereto corresponding load carrying turns of load bearing balls.

As previously noted, press system 10 is intended to exert very severe loads on, for example, sheet metal panel 25, which may be dimensioned as a door of a motor vehicle. In a practical embodiment of the invention, press system 10 is provided with a ballscrew arrangement 12 wherein the outside diameter of the screw shaft is approximately 6.000 in. with a pitch lead of 0.9845 in.(i.e., 25 mm). A practical embodiment employs 360 balls in three ball circuits, each circuit having approximately 5 active turns.

Figure 6:
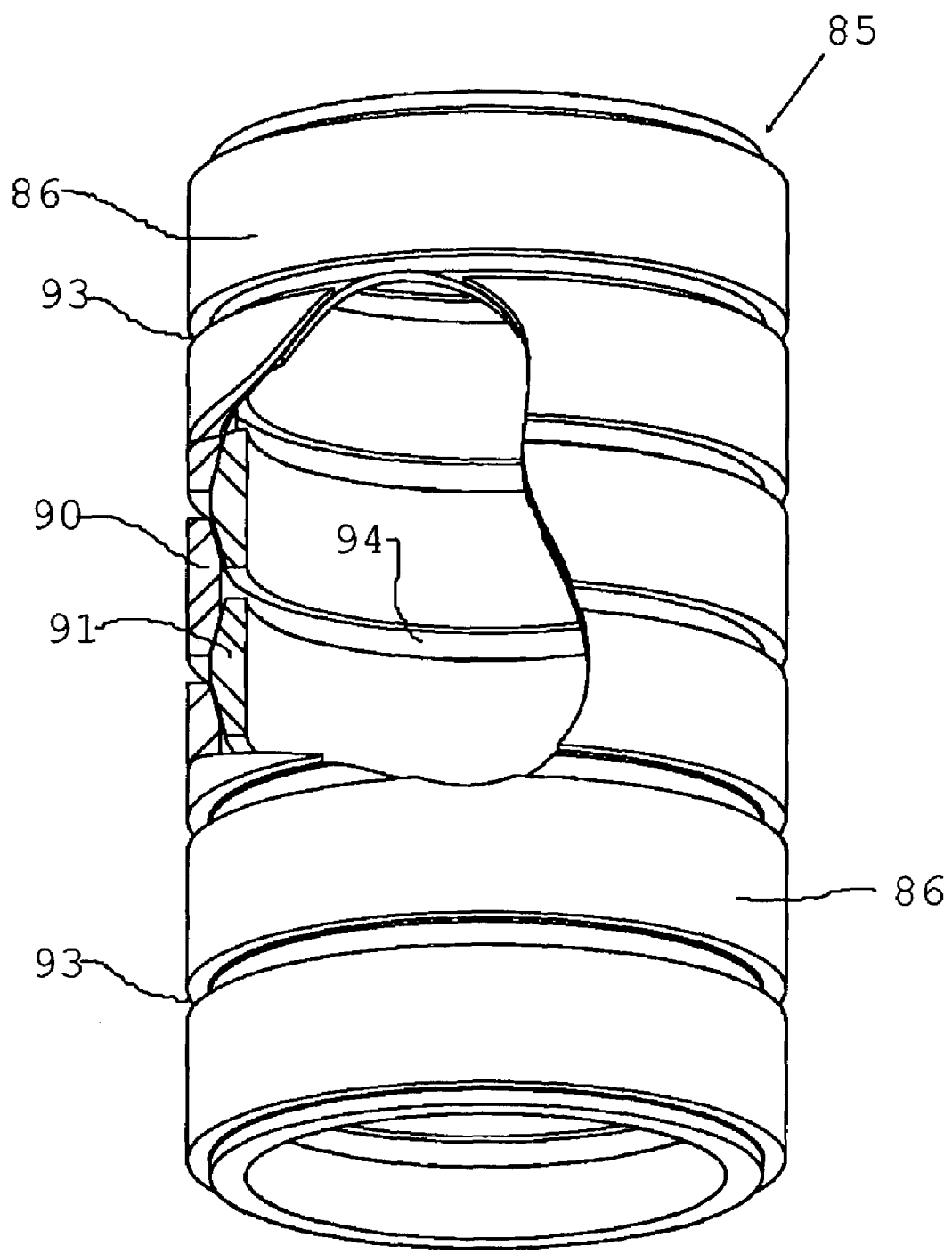
FIG. 6 is a partially fragmented perspective representation of a resilient element that absorbs at least some of the crash energy in the event of a safety system malfunction.

FIG. 6 is a schematic representation of a commercially available resilient element 85 that absorbs at least some of the crash energy in the event of a safety system malfunction. This resilient element is suitable to function as resilient element 39 in FIG. 1. As shown in FIG. 6, resilient element 85 is formed of a plurality (seven) of ring elements 86, some of which are shown to be fragmented for sake if illustration to show a symmetrical wedge-like cross-sectional configuration. Resilient element 85 is not limited to the number of ring elements shown in the figure. Each ring element has at least an outer ring 90 and an inner ring 91. Outer ring 90 is configured to exert a radially inward resilient biasing force, and conversely, inner ring 91 is configured to exert a radially outward resilient biasing force.

When an axial load is applied, the overall axial length of resilient element 85 is diminished as each of the outer and inner rings come axially closer to one another by the tendency to close gaps 93 and 94 therebetween. Such axial compression causes the outer rings to be urged radially outwardly, overcoming the radially inward resilient biasing force, and the inner rings to be urged radially inward, overcoming the radially outward resilient biasing force.

Figure 7:
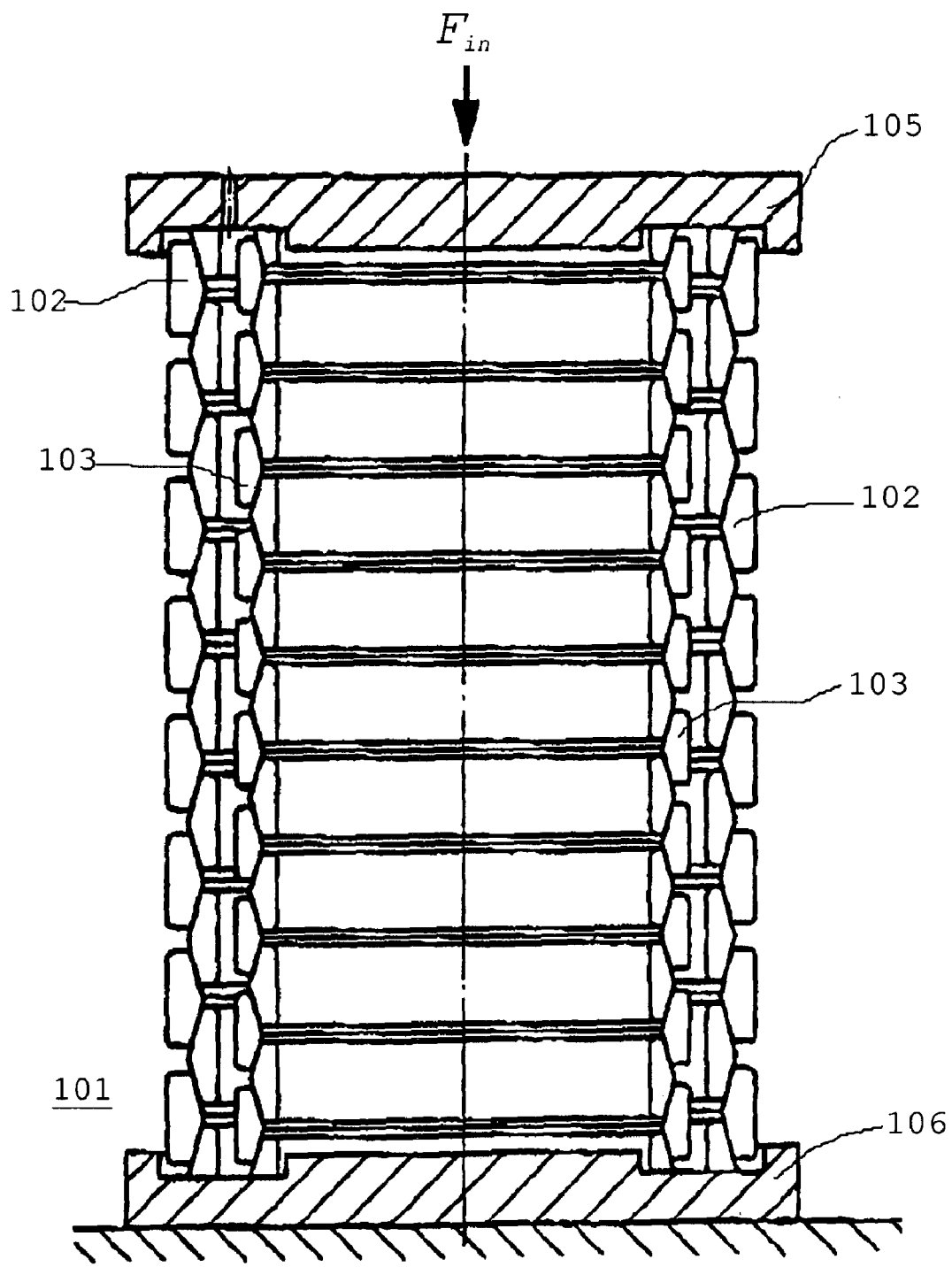
FIG. 7 is a simplified schematic representation of a resilient element of the type shown in FIG. 6.

FIG. 7 is a simplified cross-sectional schematic representation of a commercially available resilient element 101, which is generally of the type shown in FIG. 6. In this figure, resilient element 101 is shown to have two resilient sections 102 and 103, coaxially arranged. Such coaxial alignment is maintained by operation of a top end member 105 and a bottom end member 106. The coaxially aligned resilient sections provide a resilient force that counteracts an input force $F_{in}$ that is axially applied.

Figure 8:
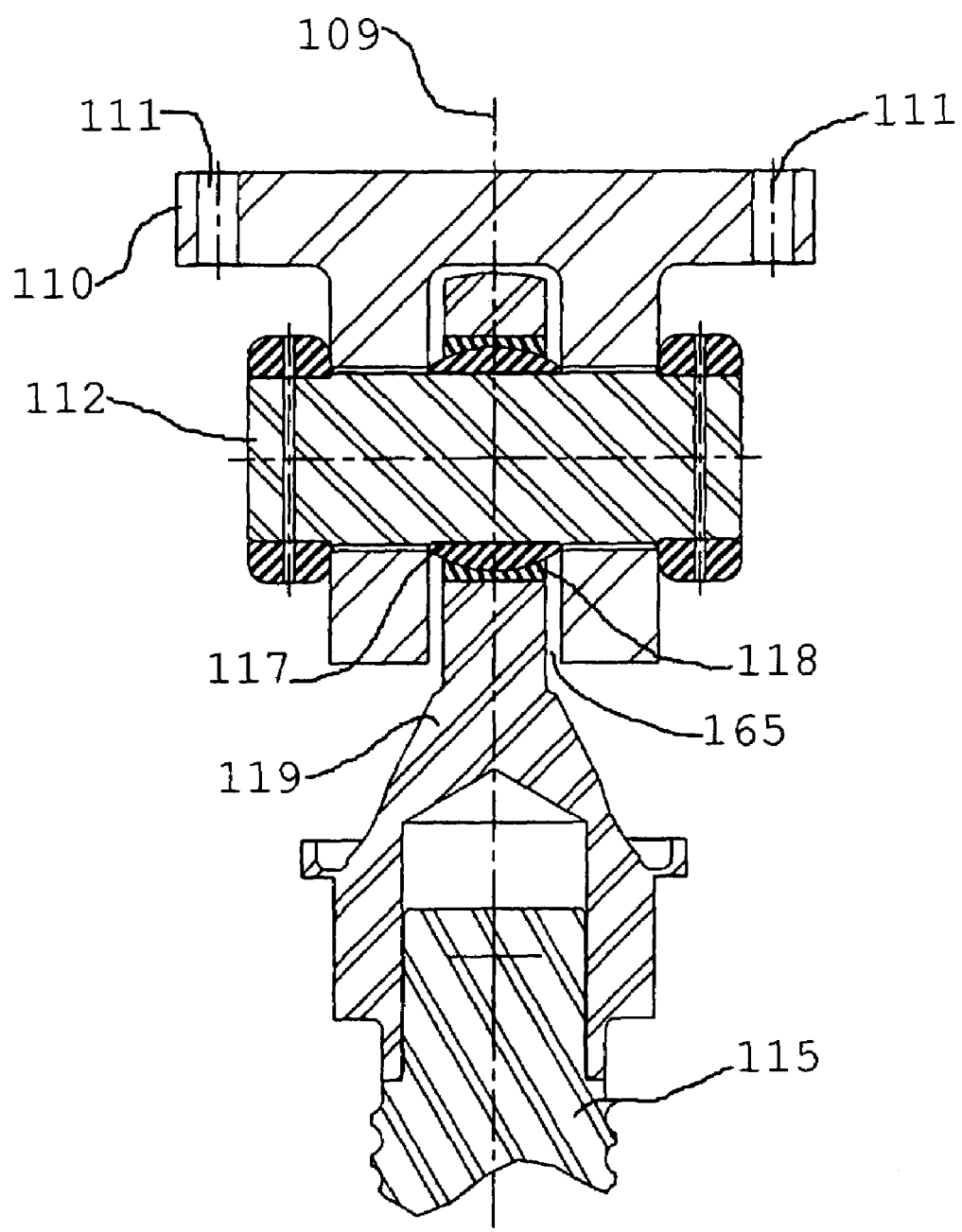
FIG. 8 is a simplified partially cross-sectional schematic representation of a specific illustrative embodiment of an arrangement that provides for the application of torque to the externally threaded shaft, while permitting transaxial displacement thereof.

FIG. 8 is a simplified partially cross-sectional schematic representation of an arrangement that provides for the application of torque to the externally threaded shaft, while permitting transaxial displacement thereof with respect to longitudinal axis 109. As shown in this figure, a yoke 110 is provided with a plurality of through holes 111 for facilitating coupling of the yoke to a rotatory drive arrangement (not shown in this figure). Yoke 110 has a support pin 112 affixed therethrough, the axis of which defines one degree of transaxial freedom of externally threaded screw shaft 115 (i.e., into and out of the plane of the drawing page). A lateral degree of freedom is provided by a spherical bearing arrangement having an inner bearing 117 installed on support pin 112, and an outer bearing 118 installed within an aperture of a connector element 119. As will be described in connection with FIG. 9, there are provided on connector element 119 lateral portions that function, in part, to maintain a spacing 165 on either side of the connector element.

Figure 9:
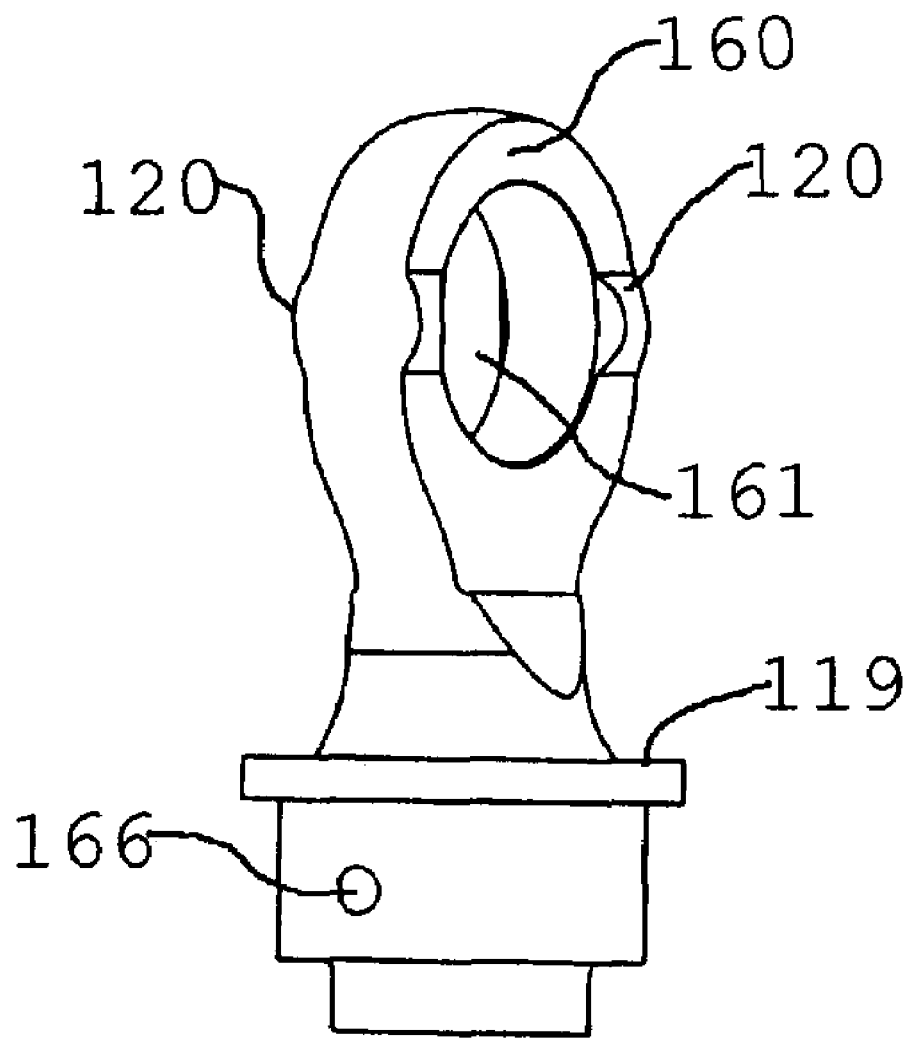
FIG. 9 is a simplified isometric representation of a connector element that is useful in the embodiment of FIG. 8.

FIG. 9 is a simplified isometric representation of connector element 119 that is useful in the embodiment of FIG. 8. As shown in this figure, connector element 119 is shown to have lateral portions 120 that are disposed on both sides of the connector element and, in this specific illustrative embodiment of the invention, are configured to have a spherical outer contour. The lateral portions serve to maintain a determined distance between the planar portion 160 of the connector element in the vicinity of through aperture 161 to accommodate the lateral freedom of transaxial movement afforded by the spherical bearing arrangement. Lateral portions 120 serve to maintain a distance between connector element 119 and the legs of yoke 110, as shown in FIG. 8. The neck portion of the connector element is provided with a through hole 166 for accommodating a pin (not shown) that will secure externally threaded shaft 115, as shown in FIG. 10.

Figure 10:
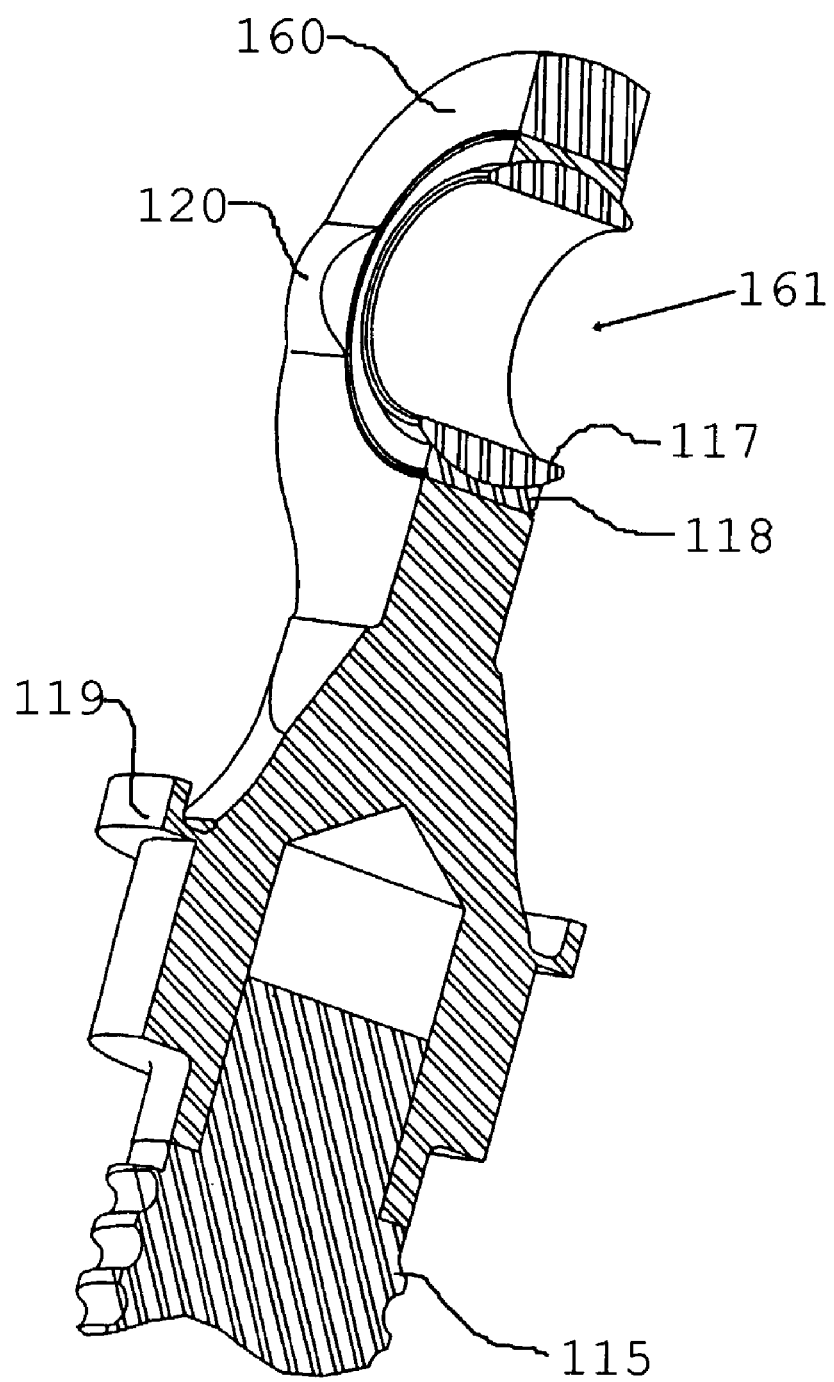
FIG. 10 is a simplified, cross-sectional isometric representation of the connector element of FIG. 9 shown installed onto the externally threaded shaft.

FIG. 10 is a simplified, cross-sectional isometric representation of connector element 119 of FIG. 9 shown installed onto externally threaded shaft 115. Inner and outer bearings 117 and 118 are shown partly in cross-section, and to be in concentric relation with respect to each other and aperture 161. As shown in this figure and in FIG. 8, inner bearing 117 is externally contoured in a spherical configuration whereby connector element 119 can be transaxially displaced to a limited extent. The interior contour of inner bearing 117 is, in this specific illustrative embodiment of the invention, substantially cylindrical in conformance with the exterior configuration of support pin 112 (FIG. 8). In essence, the connector element can rotate about inner bearing 117 (i.e., about the exterior surface of inner bearing 118 and the interior surface of outer bearing 118) so as to provide a limited range of angular motion with respect to the longitudinal axis of support pin 112. In one embodiment of the invention, such angular motion is permitted over an angular range of approximately 10 degrees. Of course, connector element can swivel about support pin 112, and therefore two degrees of transaxial (angular) displacement are permitted by this arrangement.

Figure 11:
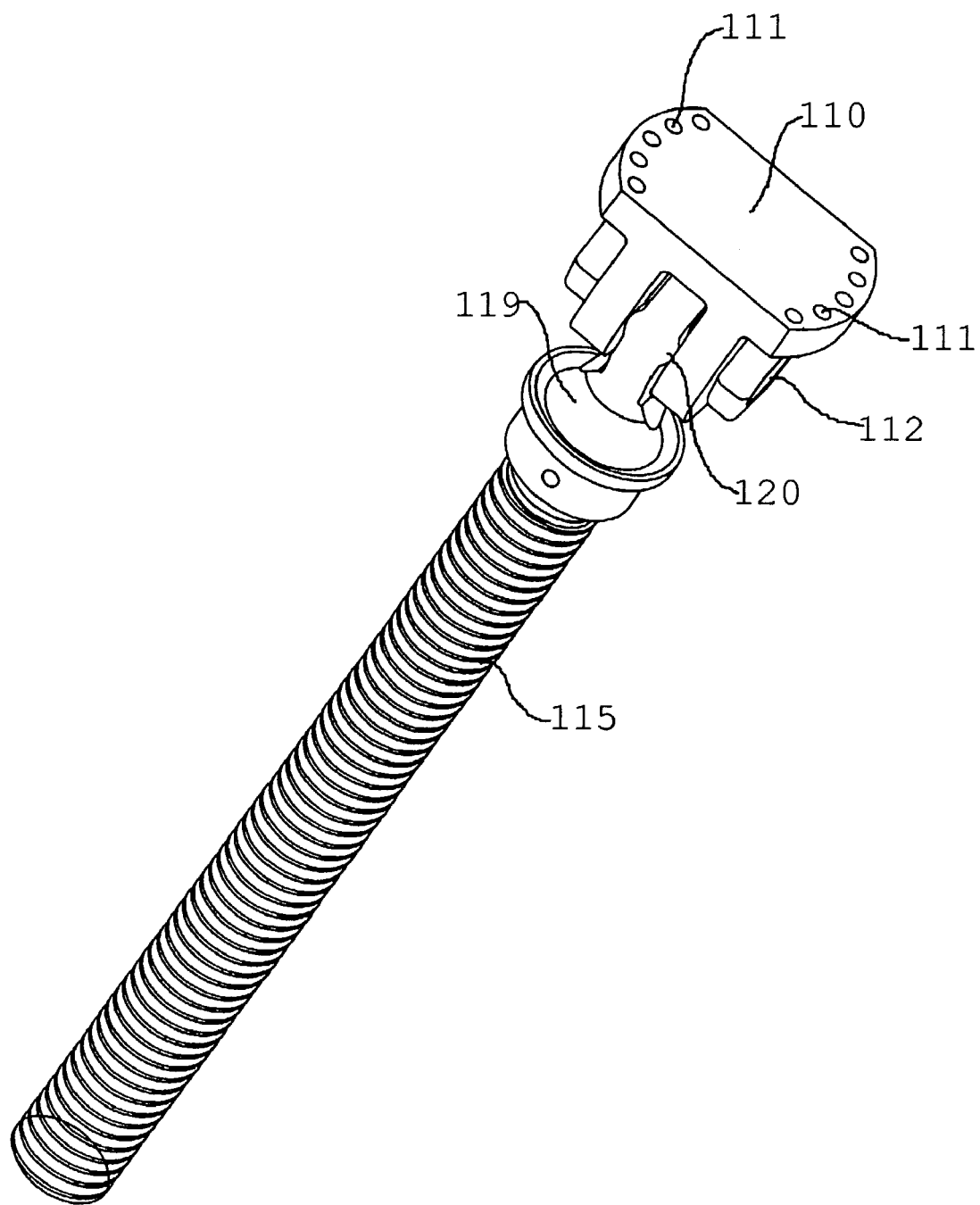
FIG. 11 is a simplified isometric representation of the embodiment of FIGS. 8–10.

FIG. 11 is a simplified isometric representation of the embodiment of FIGS. 8–10. Elements of structure that bear analogous correspondence to those previously discussed are similarly designated. As shown in this figure, multiple through holes 111 are arranged in a top portion of yoke 110. It is seen that lateral portions 120 are accommodated between the parallel protuberances of yoke 110, whereby transaxial displacement is not precluded. That is, longitudinal axis 109 (not shown in this figure) is not constrained to remain orthogonal to the top surface of yoke 110. In some embodiments, lateral portions 120 permit up to 10 degrees of displacement of externally threaded screw shaft 115 within the parallel protuberances of yoke 110.

Figure 12:
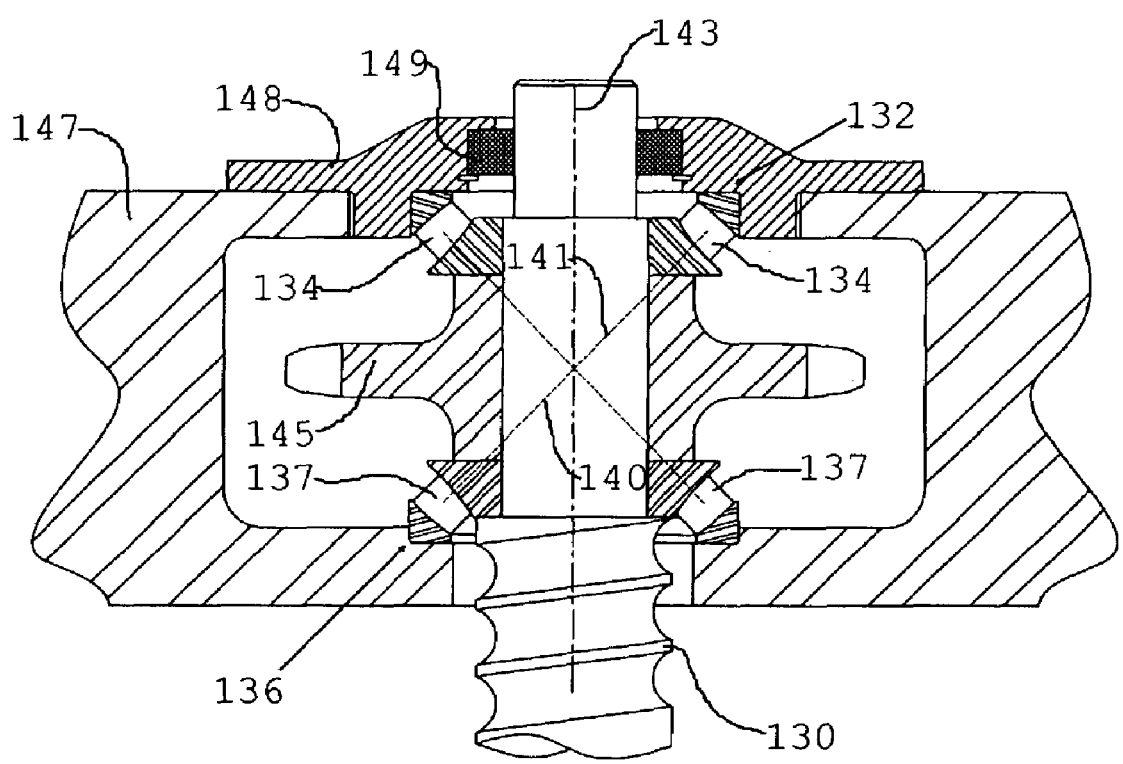
FIG. 12 is a simplified partially cross-sectional schematic representation of an arrangement that provides for the application of torque to the externally threaded shaft, while permitting angular transaxial displacement thereof with the use of spherical roller thrust bearings.

FIG. 12 is a simplified partially cross-sectional schematic representation of an arrangement that provides for the application of torque to the externally threaded shaft, while permitting transaxial displacement thereof with the use of spherical roller thrust bearings. As shown in this figure, an externally threaded screw shaft 130 has an upper bearing race 132 that has spherical bearing rollers 134 therein. There is additionally provided a lower bearing race 136 that has spherical bearing rollers 137 therein. The upper and lower bearing races are axially spaced from each other so that cross axes 140 and 141 intersect longitudinal axis 143, preferable at 45 degrees. The curvature of spherical bearing rollers 134 and 137 is determined to facilitate self-alignment.

In this specific illustrative embodiment of the invention, there is provided a sprocket 145 axially arranged intermediate of the upper and lower bearing races. A chain (not shown) couples the sprocket to a rotatory drive arrangement (not shown in this figure). In some embodiments of the invention, one or more pulleys are accommodated for permitting the coupling to the rotatory drive arrangement to be effected by other forms of flexible drive couplers, such as drive belts (not shown). Bearing races 132 and 136, as well as sprocket 145, are disposed within a support housing 147 that is terminated at its upper portion with a bearing cap 148 and a seal 149.

The practical embodiment applies an operating load of approximately between 25,000 and 50,000 lbf. in tension and approximately 220,000 lbf. in compression over a life of approximately 8.6 million cycles. The maximum static capacity is in excess of 1,000,000 lbf. Side loading should not exceed approximately ten percent (10%) of the axial load applied by the ballscrew. This becomes significant as the load becomes unbalanced, illustratively due to asymmetrical installation of the upper die, or inadvertent abandonment of a tool, such as a wrench, on the lower die bed. The inadvertent leaving of tools on the lower die, such as wrenches, will cause very large side loads and crash-level axial loads. The diameter of the trunions (i.e., pivots) is on the order of approximately between 3.00 and 5.00 inches to withstand an approximately 600,000 lbs. maximum crash load.

Figure 13:
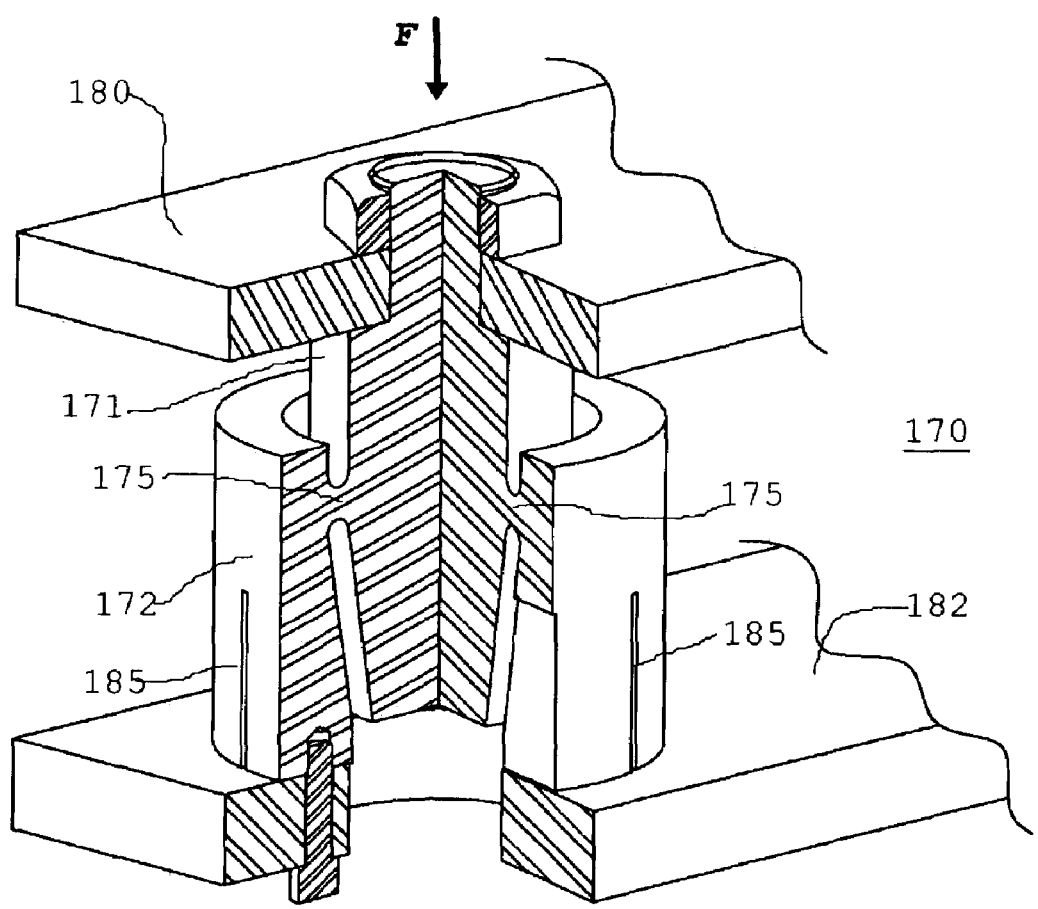
FIG. 13 is a simplified partially cross-sectional schematic representation of a device that sacrificially is destroyed upon experiencing a crash load to save the platen drive from damage.

FIG. 13 is a simplified partially cross-sectional schematic representation of a sacrificial device 170 that is sacrificially destroyed upon experiencing a crash load by releasing some of the crash loading to spare the platen drive from experiencing the full crash load and the consequential damage. In one embodiment of the invention, sacrificial device 170 is installed illustratively either between the ball nut and the traveling platen or under the stationary platen to support the stationary platen at a predetermined elevation with respect to translatable platen 16.

In a practical embodiment of the invention, translatable platen 16 is driven upward and downward by ball screw arrangement 14 in accordance with a predetermined speed pattern that is established to minimize cycle time while maintaining acceptable safety and wear rate of the drive. When translatable platen 16 is at its top most position, it is accelerated downward upon initiation of a press cycle and then slowed shortly before the engagement of translatable platen 16 with stationary platen 27. The actual engagement of the platens to perform the press operation is effected at a significantly slowed rate of plate travel. Certain safety systems, which may include limit switches (not shown), identify the location of the platen to a controller (not shown) whereby the deceleration process is commenced shortly before translatable platen 16 reached stationary platen 27. Failure of such limit switches will result in translatable platen 16 crashing into stationary platen 27 yielding such high offset and other forces that the ballscrew drive is seriously damaged. Such crash loading, as previously mentioned, may also result from a foreign object, such as a hand tool, being left on the stationary platen when the platens are brought into engagement.

The crash load force is experienced in a mechanically series arrangement of the mechanical structures, including, inter alia, the stationary platen, the translatable platen, the lower gimbal (if installed in the particular application) the ball nut, the externally threaded screw shaft, the upper gimbal (if installed in the particular application), and the stationary support. A sacrificial device can be installed in series with any of these structures, such that the crash force is accommodated by a destructive displacement between opposing ends of the sacrificial device when a threshold force lower than the force at which the platen drive would be damaged is exceeded.

Referring to FIG. 13, it is seen that sacrificial device 170 has a tapered portion 171 that, in this specific illustrative embodiment, is integrally formed with a correspondingly internally tapered receiver portion 172. Tapered portion 171 and internally tapered receiver portion 172 are secured to one another by an annular portion 175. Tapered portion 171 is shown to be connected to, and to support, a first support structure 180 that experiences, in this embodiment, a force F in the downward direction. Force F is countered by a second support structure 182, which in some applications may be mechanically grounded. Accordingly, the entire magnitude of force F is applied to compress tapered portion 171 and internally tapered receiver portion 172 toward each other. When sacrificial device 170 is used in the context of a hemming press as previously described, force F will, in the event of a crash, urge tapered portion 171 toward internally tapered receiver portion 172 with a magnitude sufficient to break annular portion 175. The force required to break the annular portion, as previously noted, has a magnitude greater than the force applied by the press during normal operation, but less that the magnitude that would damage the platen drive (not shown in this figure). Once annular portion 175 has been broken, tapered portion 171 is displaced into internally tapered receiver portion 172, such displacement having an immediate effect to reduce the forces being applied at the platen drive. Continued application of reduced force F is dissipated by the urging of tapered portion 171 into internally tapered receiver portion 172, continued displacement of tapered portion 171 therewithin being accommodated by enlargement of expansion slots 185.

Figure 14:
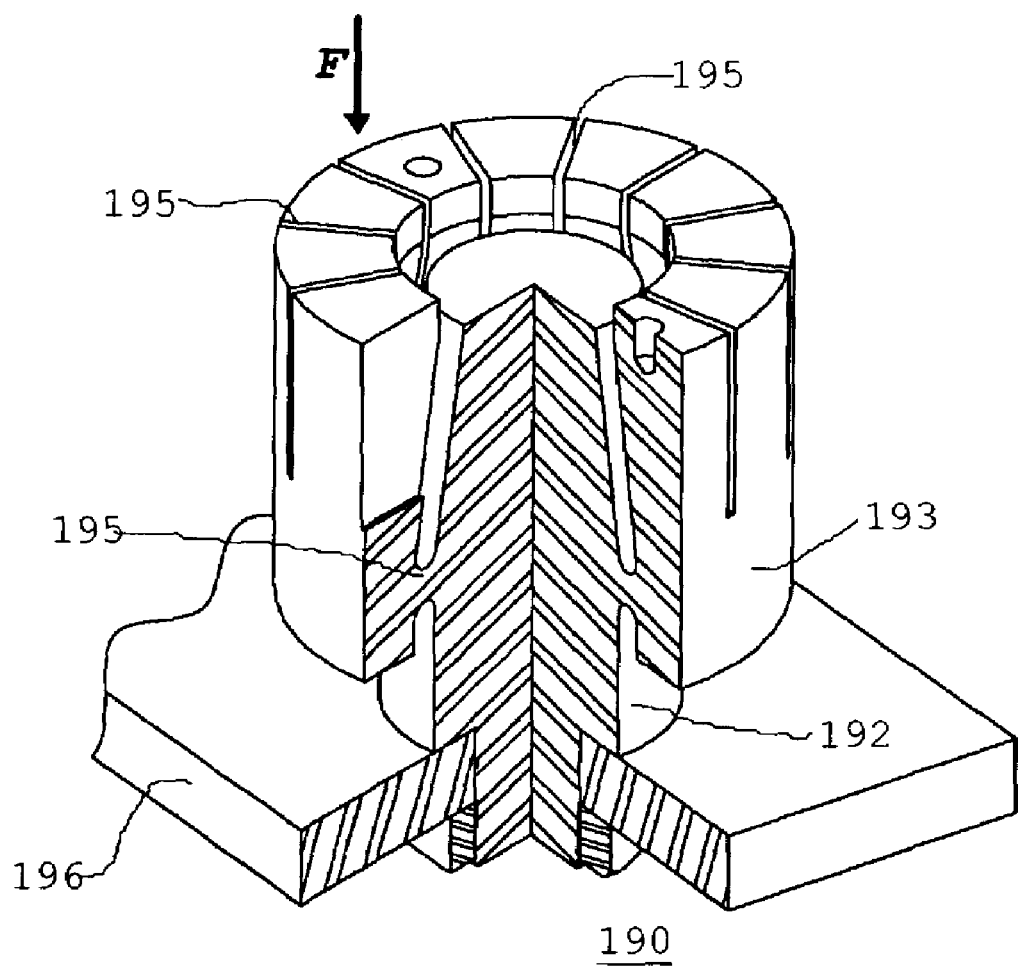
FIG. 14 is a simplified partially cross-sectional schematic representation of a further device that sacrificially is destroyed upon experiencing a crash load to save the platen drive from damage.

FIG. 14 is a simplified partially cross-sectional schematic representation of a further device 190 that sacrificially is destroyed upon experiencing a crash load to save the platen drive (not shown in this figure) from damage. In this specific illustrative embodiment, tapered portion 192 is integrally formed with a correspondingly internally tapered receiver portion 193. Tapered portion 192 and internally tapered receiver portion 193 are secured to one another by an annular portion 195. Internally tapered receiver portion 193 is shown to receive a force F in the downward direction. Force F is countered by a support structure 196, which in some applications may be mechanically grounded. Accordingly, the entire magnitude of force F is applied to compress tapered portion 192 and internally tapered receiver portion 193 toward each other. As described above in connection with the embodiment of FIG. 13, continued displacement of tapered portion 192 within internally tapered receiver portion 193 is accommodated by enlargement of expansion slots 195.

Figure 15:
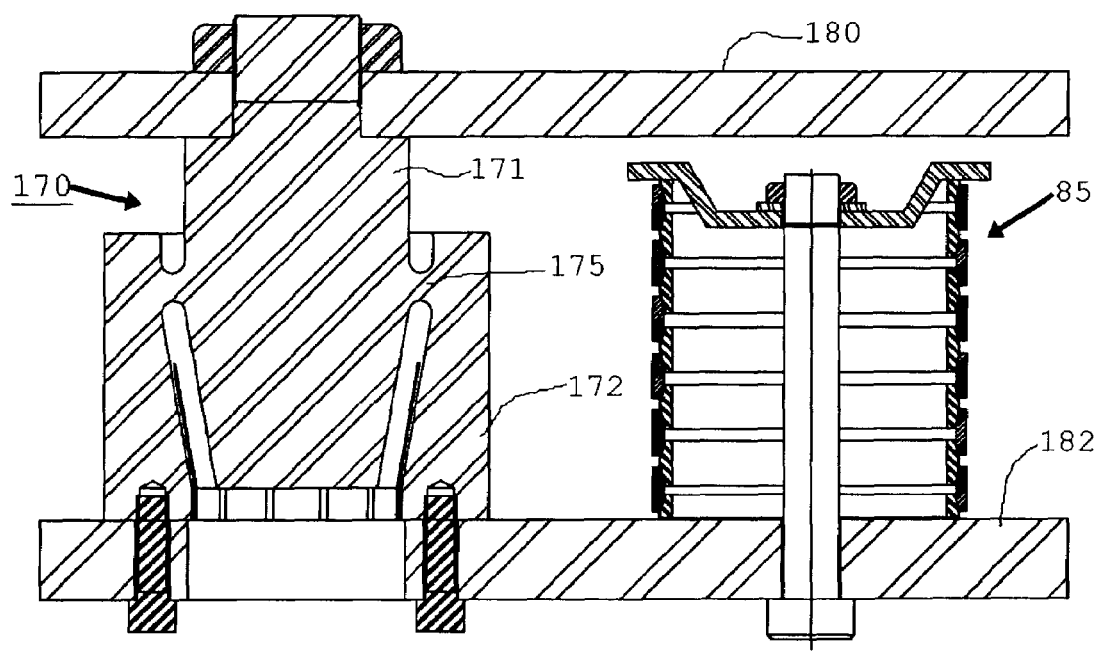
FIG. 15 is a simplified partially cross-sectional schematic representation of a device similar to that of FIG. 13 employed in combination with a resilient element such as is shown in FIG. 6.

FIG. 15 is a simplified partially cross-sectional schematic representation of a device similar to that of FIG. 13 employed in combination with a resilient element such as is shown in FIG. 6. Elements of structure that bear analogous correspondence to those previously discussed are similarly designate. As shown in this figure, sacrificial device 170 supports first support structure 180 that experiences force F in the downward direction, as previously described. Force F is countered by a second support structure 182, also as previously described, until the magnitude of F is sufficient to cause annular portion 175 to shear. In this arrangement, however, dissipation of the reduced force F is assisted by resilient element 85, which has been described hereinabove in connection with FIG. 6.

Although the invention has been described in terms of specific embodiments and applications, persons skilled in the art can, in light of this teaching, generate additional embodiments without exceeding the scope or departing from the spirit of the invention claimed herein. Accordingly, it is to be understood that the drawing and description in this disclosure are proffered to facilitate comprehension of the invention, and should not be construed to limit the scope thereof.

What is claimed is:

1. A drive arrangement for exerting a bidirectional substantially axial force between first and second structures, the drive arrangement comprising:
   a ball screw arrangement including an internally threaded nut and an externally threaded screw shaft, the externally threaded screw shaft having a longitudinal axis and being threadedly engaged with the internally threaded nut;
   a first coupling connected to the externally threaded screw shaft and configured to connect the externally threaded screw shaft and one of the first and second structures;
   a second coupling connected to the internally threaded nut and configured to connect the internally threaded nut and the other of the first and second structures, a selected one of said first and second couplings being configured to accommodate transaxial displacement of the ball screw arrangement;
   a rotatory drive arrangement for applying a torque to the ball screw arrangement for effecting rotatory displacement between the internally threaded nut and the externally threaded screw shaft, the magnitude of the bidirectional substantially axial force being responsive to the magnitude of the torque applied by the rotatory drive arrangement, and the direction of the bidirectional substantially axial force being responsive to the direction of the torque applied by the rotatory drive arrangement, wherein transaxial loading of the ball screw arrangement is accommodated by the selected one of the first and second couplings; and
   a plurality of recirculating load bearing balls arranged in sequence and interposed between the internally threaded nut and the externally threaded screw shaft, said plurality of recirculating load bearing balls being arranged in plural recirculating load bearing ball circuits.

2. The drive arrangement of claim 1, wherein there is further provided a plurality of recirculating spacer balls in the sequence of recirculating load bearing balls for reducing scuffing friction between the recirculating load bearing balls.

3. The drive arrangement of claim 2, wherein said plurality of recirculating spacer balls are each dimensioned smaller than each of said plurality of recirculating load bearing balls.

4. The drive arrangement of claim 1 wherein the selected one of said first and second couplings is configured to accommodate two degrees of transaxial freedom of displacement with respect to the longitudinal axis.

5. The drive arrangement of claim 4, wherein the selected one of said first and second couplings comprises a gimbal.

6. The drive arrangement of claim 4, wherein the selected one of said first and second couplings comprises a spherical roller thrust bearing arrangement.

7. The drive arrangement of claim 6, wherein said spherical roller thrust bearing arrangement comprises upper and lower bearing arrangements, and there is further provided a rotatory power coupling affixed to a selected one of the internally threaded nut and the externally threaded screw shaft for receiving rotatory energy from said rotatory drive arrangement, said rotatory power coupling being axially interposed between said upper and lower bearing arrangement.

8. The drive arrangement of claim 7, wherein said rotatory power coupling comprises a toothed element for engaging a correspondingly configured flexible drive member that engages said rotatory drive arrangement and transmits the rotatory energy to said toothed element.

9. The drive arrangement of claim 1, wherein each of said first and second couplings is configured to accommodate transaxial displacement with respect to the longitudinal axis of the ball screw arrangement.

10. The drive arrangement of claim 9 wherein each of said first and second couplings comprises a gimbal.

11. The drive arrangement of claim 10, wherein the first and second structures are a stationary member and a translatable platen of a press, respectively, said first coupling being arranged to connect the externally threaded screw shaft to a one of the stationary member and the translatable platen of the press, and the second coupling is arranged to couple the internally threaded nut to the other of the stationary member and the translatable platen of the press.

12. The drive arrangement of claim 1, wherein said first coupling is arranged to connect the externally threaded screw shaft to said rotatory drive arrangement.

13. The drive arrangement of claim 1, wherein said second coupling is arranged to connect the internally threaded nut to said rotatory drive arrangement.

14. A drive arrangement for exerting a bidirectional substantially axial force between first and second structures that are vertically movable with respect to each other, the drive arrangement comprising:
   a screw drive arrangement including an internally threaded nut and an externally threaded screw shaft, the externally threaded screw shaft having a vertically arranged longitudinal axis and being threadedly engaged with the internally threaded nut;
   a first coupling connected to the externally threaded screw shaft and configured to connect the externally threaded screw shaft and the first structure, the first structure being fixed in a superior location to the second structure;
   a second coupling connected to the internally threaded nut and configured to connect the internally threaded nut and the second structure at a predetermined location of the second structure, the second structure having an imbalance about the predetermined location, a selected one of said first and second couplings being configured to accommodate transaxial displacement of the screw drive arrangement;
   a rotatory drive arrangement for applying a torque to the screw drive arrangement for effecting rotatory displacement between the internally threaded nut and the externally threaded screw shaft, the magnitude of the bidirectional substantially axial force being responsive to the magnitude of the torque applied by the rotatory drive arrangement, and the direction of the bidirectional substantially axial force being responsive to the direction of the torque applied by the rotatory drive arrangement, wherein transaxial loading of the screw drive arrangement resulting from the imbalance of the second structure is accommodated by the selected one of the first and second couplings configured to accommodate transaxial displacement of the screw drive arrangement; and a working die installed on the second structure, said working die being asymmetrically arranged about the predetermined location of the second structure where said second coupling is connected so as to cause an imbalance.

15. The drive arrangement of claim 14, wherein said second coupling is the selected one of said first and second couplings being configured to accommodate transaxial displacement of the screw drive arrangement.

16. The drive arrangement of claim 15, wherein the selected one of said first and second couplings is configured to accommodate a transaxial displacement of the screw drive arrangement of up to 10 degrees.

17. The drive arrangement of claim 15, wherein the accommodation of transaxial displacement limits transaxial loading of the screw drive arrangement to less than approximately ten percent (10%) of the axial load.

18. The drive arrangement of claim 17, wherein the accommodated transaxial displacement is less than 3 degrees.

19. The drive arrangement of claim 15, wherein said first coupling is configured to accommodate transaxial displacement of the screw drive arrangement.

20. The drive arrangement of claim 14, wherein there is further provided a guide arrangement for guiding the second structure along a predetermined path in response to the torque applied by said rotatory drive arrangement.

21. The drive arrangement of claim 20, wherein said guide arrangement comprises:
a vertical guide post; and
a guide bushing engaged with said vertical post, said guide bushing being coupled to said second structure.

22. The drive arrangement of claim 21, wherein said second structure comprises a movable platen of a press.

23. The drive arrangement of claim 22, wherein there is further provided an energy absorbing element for absorbing energy resulting from a crash load of the movable platen.

24. The drive arrangement of claim 23, wherein said energy absorbing element comprises a resilient element having a predetermined resilience characteristic responsive to the application of an axial load.

25. The drive arrangement of claim 24, wherein said resilient element comprises a wedge-shaped resilient element that converts axial deformation responsive to the application of the axial load into radial resilient deformation.

26. The drive arrangement of claim 22, wherein the press is a hemming press for stamping and hemming sheet metal components for vehicles, and the movable platen experiences an operating load of approximately between 25,000 lbf. and 50,000 lbf. in tension and approximately 220,000 lbf. in compression.

27. The drive arrangement of claim 26, wherein the operating load is applied over a service life of approximately 8.6 million cycles.

28. The drive arrangement of claim 27, wherein said screw drive arrangement is a ballscrew arrangement, and there is further provided a plurality of load bearing balls interposed between the internally threaded nut and the externally threaded screw shaft.

29. The drive arrangement of claim 28, wherein the screw shaft is dimensionally characterized by:
an outside diameter of approximately 6 in.; and
a pitch lead of approximately 0.9845 in.

30. The drive arrangement of claim 28, wherein said screw drive arrangement is a free fall ballscrew arrangement with zero pre-load.

31. The drive arrangement of claim 28, wherein the plurality of load bearing balls interposed between the internally threaded nut and the externally threaded screw shaft are dimensioned within a tolerance of approximately 25 millionths of an inch.

32. The drive arrangement of claim 31, wherein the externally threaded screw shaft is hardened to approximately between 56 to 60 on the Rockwell hardness scale.

33. The drive arrangement of claim 31, wherein the plurality of load bearing balls comprises 360 load bearing balls arranged in three ball circuits, each circuit having approximately 5 active turns.

34. A drive arrangement for a platen of an automotive body panel stamping press, the drive arrangement comprising:
a ballscrew apparatus including an internally threaded nut and an externally threaded screw shaft threadedly engaging the internally threaded nut and there is further provided a plurality of recirculating load bearing balls arranged in sequence and interposed between the internally threaded nut and the externally threaded screw shaft, the load bearing balls being arranged in a plurality of recirculating load bearing ball circuits, said ballscrew apparatus being a free fall ballscrew arrangement with zero pre-load,
a first coupling connected to the externally threaded screw shaft for connecting the externally threaded screw shaft to a stationary member of the press;
a second coupling connected to the internally threaded nut for connecting the internally threaded nut to the platen of the press; and
a rotatory drive arrangement connected to the externally threaded screw shaft and configured to rotate the externally threaded screw shaft relative to the internally threaded nut and thereby impart a substantially axial reciprocal motion between the movable platen and the stationary member of the press, at least one of said first and second couplings being arranged to accommodate transaxial loading of said ballscrew apparatus during the substantially axial reciprocal motion between the movable platen and the stationary member of the press, the substantially axial reciprocal motion between the movable platen and the stationary member of the press being oriented vertically.

35. The drive arrangement of claim 34, wherein said first coupling comprises a gimbal that is arranged to provided two degrees of transaxial freedom to said externally threaded screw shaft relative to the substantially axial reciprocal motion between the movable platen and the stationary member of the press.

36. The drive arrangement of claim 35, wherein the accommodation of transaxial displacement limits transaxial loading of the screw drive arrangement to less than approximately ten percent (10%) of the axial load.

37. The drive arrangement of claim 35, wherein the accommodated transaxial displacement is less than 3 degrees.

38. The drive arrangement of claim 35, wherein the screw shaft is dimensionally characterized by:
   an outside diameter of approximately 6 in.; and
   a pitch lead of approximately 0.9845 in.

39. The drive arrangement of claim 34, wherein said second coupling comprises a gimbal that is arranged to provided two degrees of transaxial freedom to said internally threaded nut relative to the substantially axial reciprocal motion between the movable platen and the stationary member of the press.

40. The drive arrangement of claim 34, wherein said first coupling comprises a spherical roller thrust bearing arrangement that is arranged to provided two degrees of transaxial freedom to said externally threaded screw shaft relative to the substantially axial reciprocal motion between the movable platen and the stationary member of the press.

41. The drive arrangement of claim 40, wherein said spherical roller thrust bearing arrangement comprises upper and lower bearing arrangements, and there is further provided a rotatory power coupling affixed to said externally threaded screw shaft for receiving rotatory energy from said rotatory drive arrangement, said rotatory power coupling being axially interposed between said upper and lower bearing arrangement.

42. The drive arrangement of claim 34, wherein said first coupling comprises a partially spherical end portion of said externally threaded screw shaft.

43. The drive arrangement of claim 42, wherein said partially spherical end portion of said externally threaded screw shaft is internally partially spherical.

44. The drive arrangement of claim 34, wherein there is further provided a plurality of recirculating spacer balls in the sequences of recirculating load bearing balls in the plural recirculating load bearing ball circuits for reducing scuffing friction between the recirculating load bearing balls.

45. The drive arrangement of claim 34, wherein the plurality of load bearing balls comprises approximately 360 load bearing balls arranged in three ball circuits, each circuit having approximately 5 active turns.

46. The drive arrangement of claim 34, wherein the plurality of recirculating load bearing balls interposed between the internally threaded nut and the externally threaded screw shaft are dimensioned within a tolerance of approximately 25 millionths of an inch.

47. The drive arrangement of claim 46, wherein the externally threaded screw shaft is hardened to approximately between 56 to 60 on the Rockwell hardness scale.

* * * * *